United States Patent
Ma

(10) Patent No.: US 9,812,012 B2
(45) Date of Patent: Nov. 7, 2017

(54) MESSAGE PROCESSING METHOD, IN-VEHICLE TERMINAL, AND BASE STATION

(71) Applicant: Huawei Technologies Co., Ltd., Shenzhen, Guangdong (CN)

(72) Inventor: Jie Ma, Beijing (CN)

(73) Assignee: Huawai Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/356,315

(22) Filed: Nov. 18, 2016

(65) Prior Publication Data

US 2017/0069207 A1 Mar. 9, 2017

Related U.S. Application Data

(63) Continuation of application No. PCT/CN2014/091677, filed on Nov. 19, 2014.

(30) Foreign Application Priority Data

May 20, 2014 (CN) .......................... 2014 1 0214795

(51) Int. Cl.
G08G 1/09 (2006.01)
G08G 1/0967 (2006.01)
(Continued)

(52) U.S. Cl.
CPC ....... *G08G 1/096791* (2013.01); *H04L 29/08* (2013.01); *H04L 67/12* (2013.01);
(Continued)

(58) Field of Classification Search
CPC ... G08G 1/096791; H04L 29/08; H04L 67/12; H04W 4/046; H04W 4/12
See application file for complete search history.

(56) References Cited

U.S. PATENT DOCUMENTS 7,363,117 B2 * 4/2008 Tengler .................. G01C 21/26
340/903
8,514,825 B1 8/2013 Addepalli et al.
(Continued)

FOREIGN PATENT DOCUMENTS

CN          102088442 A      6/2011
CN          102724663 A     10/2012
(Continued)

OTHER PUBLICATIONS

3GPP2 Draft, "Draft Report of the Global Standards Collaboration (GSC) Task Force on Emergency Communications," vol. 12, Rev. 5, 3rd Generation Partnership Project 2, 3GPP2, 2005 Wilson Boulevard, Suite 300, Arlington, VA 22201, Mar. 10, 2013, pp. 1-53, XP062131472.

Primary Examiner — Hai Phan
Assistant Examiner — Royit Yu

(57) ABSTRACT

The present disclosure provides a message processing method, an in-vehicle terminal, and a base station. The method executed by a first in-vehicle terminal includes: first, generating a safety message, where the safety message includes message content and a message type; then, determining, according to the message content and the message type, a priority value corresponding to the safety message; finally, sending, according to the priority value corresponding to the safety message, the safety message by using a vehicle direct communication physical VDC PHY layer or separately by using a cellular physical cellular PHY layer and a VDC PHY layer, so that a base station and/or a second in-vehicle terminal receive/receives the safety message, and the first in-vehicle terminal can send, under a preset delay requirement, the safety message to another in-vehicle terminal in a distance range that needs to be covered by the safety message.

14 Claims, 5 Drawing Sheets

(51) Int. Cl.
    *H04L 29/08*     (2006.01)
    *H04W 4/04*     (2009.01)
    *H04W 4/12*     (2009.01)
    *H04W 4/22*     (2009.01)
    *H04W 76/02*     (2009.01)

(52) U.S. Cl.
    CPC ............ *H04W 4/046* (2013.01); *H04W 4/12* (2013.01); *H04W 4/22* (2013.01); *H04W 76/023* (2013.01)

(56) References Cited

U.S. PATENT DOCUMENTS

| | | | |
|---|---|---|---|
| 9,125,020 B2 * | 9/2015 | Banasky, Jr. | G01C 21/26 |
| 9,406,177 B2 * | 8/2016 | Attard | G07C 5/008 |
| 2003/0073406 A1 * | 4/2003 | Benjamin | G08G 1/0962 |
| | | | 455/41.1 |
| 2013/0279491 A1 * | 10/2013 | Rubin | G08G 1/166 |
| | | | 370/347 |
| 2014/0302774 A1 * | 10/2014 | Burke | H04H 20/57 |
| | | | 455/3.05 |

FOREIGN PATENT DOCUMENTS

| | | |
|---|---|---|
| CN | 102917372 A | 2/2013 |
| CN | 103312788 A | 9/2013 |
| WO | 2014012244 A1 | 1/2014 |

\* cited by examiner

MESSAGE PROCESSING METHOD, IN-VEHICLE TERMINAL, AND BASE STATION

CROSS-REFERENCE TO RELATED APPLICATIONS

This application is a continuation of International Application No. PCT/CN2014/091677, filed on Nov. 19, 2014, which claims priority to Chinese Patent Application No. 201410214795.6, filed on May 20, 2014, both of which are hereby incorporated by reference in their entireties.

TECHNICAL FIELD

Embodiments of the present invention relate to an Internet of Vehicles communications technology, and in particular, to a message processing method, an in-vehicle terminal, and a base station.

BACKGROUND

Internet of Vehicles is a vehicle Internet. A mobile communications module is installed on a vehicle terminal, that is, the vehicle terminal has a mobile communication capability, and communication between vehicles can be implemented by using a mobile communications network. Currently, communication modes used for the Internet of Vehicles mainly include two types: a cellular communication mode and a dedicated short range communications (DSRC) technology developed by the United States of America. The cellular communication mode means that an in-vehicle terminal sends a safety message to a base station and the base station processes the safety message. For example, the base station sends the safety message to a traffic information processing server, and the traffic information processing server forwards the safety message to a local area, so as to transmit the safety message to a larger range. The DSRC technology means that a device with a DSRC function is installed on each vehicle, and when a vehicle sends a safety message, a vehicle that receives the safety message may forward the safety message. After being forwarded multiple times by vehicles, the safety message reaches a distance covered by the safety message. For example, when a safety message needs to cover 2000 m and a vehicle on which a device with a DSRC function is installed sends a safety message at a distance of 300 m, the safety message needs to be forwarded six times by other vehicles before reaching a vehicle 2000 m away.

However, in the cellular communication mode, a safety message needs to pass through multiple transmission paths before reaching the traffic information processing server, and then the server determines a transmission area to perform forwarding by using an air interface. Therefore, a long transmission delay problem is caused for the safety message. In addition, in the DSRC technology, when there are few vehicles on a road, for example, there are less than two moving vehicles within 300 m, the safety message cannot be forwarded, that is, the safety message cannot be forwarded to a vehicle in a predetermined distance range; when vehicles on a road are in extremely high density, each vehicle forwards the safety message after receiving the safety message, and therefore, a broadcast storm is caused, and the safety message may not be forwarded to a vehicle in a predetermined distance range within a specified time.

SUMMARY

To overcome a disadvantage in the prior art, the present disclosure provides a message processing method, an in-vehicle terminal, and a base station, so that an in-vehicle terminal can send, under a preset delay requirement, a safety message to another in-vehicle terminal in a distance range that needs to be covered by the safety message.

According to a first aspect, an embodiment of the present invention provides a message processing method, including: generating, by a first in-vehicle terminal, a safety message, where the safety message includes message content and a message type; determining, by the first in-vehicle terminal according to the message content and the message type, a priority value corresponding to the safety message; and sending, by the first in-vehicle terminal according to the priority value corresponding to the safety message, the safety message by using a vehicle direct communication physical VDC PHY layer or separately by using a cellular physical cellular PHY layer and the VDC PHY layer, so that a base station and/or a second in-vehicle terminal receive/receives the safety message, where the base station and the first in-vehicle terminal each pre-establish a vehicle direct communication-radio bearer VDC-RB.

With reference to the first aspect, in a first possible implementation manner of the first aspect, the sending, by the first in-vehicle terminal according to the priority value corresponding to the safety message, the safety message by using a vehicle direct communication physical VDC PHY layer or separately by using a cellular physical cellular PHY layer and the VDC PHY layer includes: if the first in-vehicle terminal determines that the priority value corresponding to the safety message is less than a preset threshold, applying, by the first in-vehicle terminal, to the base station for a vehicle direct communication VDC dedicated resource, and sending the safety message by using the DVC PHY layer and by using the obtained vehicle direct communication VDC dedicated resource; or if the first in-vehicle terminal determines that the priority value corresponding to the safety message is greater than or equal to the preset threshold, sending, by the first in-vehicle terminal, the safety message by using the VDC PHY layer and by using a VDC resource in a contention manner.

With reference to the first possible implementation manner of the first aspect, in a second possible implementation manner of the first aspect, the method further including: if the first in-vehicle terminal determines that the message content is message content transmitted in a wide range, further sending, by the first in-vehicle terminal, the safety message by using the cellular PHY layer.

With reference to the first possible implementation manner of the first aspect, in a third possible implementation manner of the first aspect, the determining, by the first in-vehicle terminal according to the message content and the message type, a priority value corresponding to the safety message includes: if a delay requirement corresponding to the message content and the message type is less than a preset delay requirement and/or a corresponding distance requirement is less than a preset distance requirement, determining, by the first in-vehicle terminal, that the priority value corresponding to the safety message is less than the preset threshold; or if the delay requirement corresponding to the message content and the message type is greater than or equal to the preset delay requirement and/or the corresponding distance requirement is greater than or equal to the preset distance requirement, determining, by the first in-vehicle terminal, that the priority value corresponding to the safety message is greater than or equal to the preset threshold.

With reference to the first aspect, in a fourth possible implementation manner of the first aspect, after the generating, by a first in-vehicle terminal, a safety message, and before the sending, by the first in-vehicle terminal according to the priority value corresponding to the safety message, the safety message by using a vehicle direct communication physical VDC PHY layer or separately by using a cellular physical cellular PHY layer and the VDC PHY layer, the method further includes: adding, by the first in-vehicle terminal, obtained location information and speed information to the safety message by using an Intelligent Transportation System Protocol ITSP layer; and transparently transmitting, by the first in-vehicle terminal, the safety message from the ITSP layer to a Media Access Control MAC layer by using a Packet Data Convergence Protocol layer PDCP layer and a Radio Link Control layer RLC layer; and the sending, by the first in-vehicle terminal according to the priority value corresponding to the safety message, the safety message by using a vehicle direct communication physical VDC PHY layer or separately by using a cellular physical cellular PHY layer and the VDC PHY layer includes: triggering, by the first in-vehicle terminal, the MAC layer to send, according to the location information, the speed information, and the priority value corresponding to the safety message, the safety message by using the VDC PHY layer or separately by using the cellular PHY layer and the VDC PHY layer.

According to a second aspect, an embodiment of the present invention provides a message processing method, including: receiving, by a base station, a safety message by using a cellular physical cellular PHY layer and/or a vehicle direct communication physical VDC PHY layer; triggering, by the base station, a Media Access Control MAC layer to identify the safety message and send the safety message to an Intelligent Transportation System Protocol ITSP layer; and triggering, by the base station, the ITSP layer to determine, according to a message type in the safety message and location information in the safety message, whether to forward the safety message, and determine a forwarding area or a forwarding server address corresponding to a case in which the safety message needs to be forwarded.

With reference to the second aspect, in a first possible implementation manner of the second aspect, the triggering, by the base station, the ITSP layer to determine, according to a message type in the safety message and location information in the safety message, whether to forward the safety message, and determine a forwarding area or a forwarding server corresponding to a case in which the safety message needs to be forwarded includes: triggering, by the base station, the ITSP layer to query, according to the message type in the safety message, a preconfigured mapping relationship between a message type and a message priority, so as to determine a priority value corresponding to the safety message; and querying a preconfigured mapping relationship table between a priority value and forwarding, so as to determine whether to forward the safety message, and determining the corresponding forwarding area or the corresponding forwarding server address when the safety message needs to be forwarded.

With reference to the second aspect, in a second possible implementation manner of the second aspect, the forwarding area corresponding to the case in which the safety message needs to be forwarded includes a coverage area of the base station or further includes a coverage area of another base station adjacent to the base station.

With reference to the second possible implementation manner of the second aspect, in a third possible implementation manner of the second aspect, when the forwarding area is the coverage area of the base station, the base station forwards the safety message by using a broadcast transmission channel BCH of the base station or a safety message broadcast channel of the base station.

With reference to the second aspect, in a fourth possible implementation manner of the second aspect, if the base station receives the safety message by using the cellular physical cellular PHY layer and the vehicle direct communication physical VDC PHY layer, the method further includes: triggering, by the base station, the MAC layer to perform combination processing on the safety messages with a same sequence number that are received separately by using the Cellular PHY layer and the VDC PHY layer; and the triggering, by the base station, a Media Access Control MAC layer to identify the safety message and send the safety message to an ITSP layer includes: triggering, by the base station, the MAC layer to identify a safety message obtained after the combination processing and send the safety message obtained after the combination processing to the ITSP layer.

With reference to any one of the second aspect, the first possible implementation manner of the second aspect, the second possible implementation manner of the second aspect, the third possible implementation manner of the second aspect, or the fourth possible implementation manner of the second aspect, in a fifth possible implementation manner of the second aspect, the triggering, by the base station, a Media Access Control MAC layer to identify the safety message and send the safety message to an ITSP layer includes: if the base station identifies, by using the MAC layer, that the safety message is from the ITSP layer of the in-vehicle terminal, transparently sending, by the base station, the safety message to the ITSP layer separately by using a Radio Link Control layer RLC layer and a Packet Data Convergence Protocol layer PDCP layer.

According to a third aspect, an embodiment of the present invention provides an in-vehicle terminal, including: a generation module, configured to generate a safety message, where the safety message includes message content and a message type; a determining module, configured to determine, according to the message content and the message type, a priority value corresponding to the safety message; and a sending module, configured to send, according to the priority value corresponding to the safety message, the safety message by using a vehicle direct communication physical VDC PHY layer or separately by using a cellular physical cellular PHY layer and the VDC PHY layer, so that a base station and/or a second in-vehicle terminal receive/receives the safety message, where the base station and the in-vehicle terminal each pre-establish a vehicle direct communication-radio bearer VDC-RB.

With reference to the third aspect, in a first possible implementation manner of the third aspect, the in-vehicle terminal further includes: a judging module, configured to determine whether the priority value corresponding to the safety message is less than a preset threshold; and the sending module is specifically configured to: if the judging module determines that the priority value corresponding to the safety message is less than the preset threshold, apply to the base station for a vehicle direct communication VDC dedicated resource, and send the safety message by using the DVC PHY layer and by using the obtained vehicle direct communication VDC dedicated resource; or if the judging module determines that the priority value corresponding to the safety message is greater than or equal to the preset threshold, send the safety message by using the VDC PHY layer and by using a VDC resource in a contention manner.

With reference to the first possible implementation manner of the third aspect, in a second possible implementation manner of the third aspect, the sending module is further configured to: if the judging module determines that the message content is message content transmitted in a wide range, send the safety message by using the cellular PHY layer.

With reference to the first possible implementation manner of the third aspect, in a third possible implementation manner of the third aspect, the determining module is specifically configured to: if a delay requirement corresponding to the message content and the message type is less than a preset delay requirement and/or a corresponding distance requirement is less than a preset distance requirement, determine that the priority value corresponding to the safety message is less than the preset threshold; or if the delay requirement corresponding to the message content and the message type is greater than or equal to the preset delay requirement and/or the corresponding distance requirement is greater than or equal to the preset distance requirement, determine that the priority value corresponding to the safety message is greater than or equal to the preset threshold.

With reference to the third aspect, in a fourth possible implementation manner of the third aspect, the in-vehicle terminal further includes: an adding module, configured to add obtained location information and speed information to the safety message by using an Intelligent Transportation System Protocol ITSP layer; and a transmission module, configured to transparently transmit the safety message from the ITSP layer to a Media Access Control MAC layer by using a Packet Data Convergence Protocol layer PDCP layer and a Radio Link Control layer RLC layer; and the sending module is specifically configured to trigger the MAC layer to send, according to the location information, the speed information, and the priority value corresponding to the safety message, the safety message by using the VDC PHY layer or separately by using the cellular PHY layer and the VDC PHY layer.

With reference to any one of the third aspect, the first possible implementation manner of the third aspect, the second possible implementation manner of the third aspect, the third possible implementation manner of the third aspect, or the fourth possible implementation manner of the third aspect, in a fifth possible implementation manner of the third aspect, the VDC-RB includes: a Transmission Control Protocol TCP/Internet Protocol IP unit, configured to run the Transmission Control Protocol TCP/Internet Protocol IP; an Intelligent Transportation System Protocol ITSP unit, configured to run the Intelligent Transportation System Protocol ITSP; a Media Access Control MAC unit, configured to configure an Intelligent Transportation System Protocol-common transport channel ITS-CCH, where the ITS-CCH is used to: receive a safety message sent by a vehicle direct communication physical VDC PHY unit of the in-vehicle terminal, delete a transmitter identifier of the safety message, and send the safety message to a Radio Link Control RLC unit, and the ITS-CCH is further used to receive a safety message transmitted by the RLC unit and select, according to the location information, the speed information, and the priority value corresponding to the safety message, the VDC PHY layer to send the safety message, or the cellular PHY layer and the VDC PHY layer to send the safety message; the RLC unit, configured to send the safety message to a Packet Data Convergence Protocol PDCP unit in a transparent transmission mode; the PDCP unit, configured to send the safety message to an Intelligent Transportation System Protocol ITSP unit in the transparent transmission mode; a cellular PHY unit, configured to perform cellular communication with the base station; and the VDC PHY unit, configured to perform direct communication with the base station or another in-vehicle terminal.

According to a fourth aspect, an embodiment of the present invention provides a base station, including: a transceiver module, configured to receive a safety message by using a cellular physical cellular PHY layer and/or a vehicle direct communication physical VDC PHY layer, where the transceiver module is further configured to trigger a Media Access Control MAC layer to identify the safety message and send the safety message to an Intelligent Transportation System Protocol ITSP layer; and a forwarding processing module, configured to trigger the ITSP layer to determine, according to a message type in the safety message and location information in the safety message, whether to forward the safety message, and determine a forwarding area or a forwarding server address corresponding to a case in which the safety message needs to be forwarded.

With reference to the fourth aspect, in a first possible implementation manner of the fourth aspect, the forwarding processing module includes: a determining unit, configured to trigger the ITSP layer to query, according to the message type in the safety message, a preconfigured mapping relationship between a message type and a message priority, so as to determine a priority value corresponding to the safety message; and a forwarding determining unit, configured to query a preconfigured mapping relationship table between a priority value and forwarding, so as to determine whether to forward the safety message, and determine the forwarding area or the corresponding forwarding server address when the safety message needs to be forwarded.

With reference to the fourth aspect or the first possible implementation manner of the fourth aspect, in a second possible implementation manner of the fourth aspect, when the forwarding area is a coverage area of the base station, the forwarding processing module is specifically configured to forward the safety message by using a broadcast transmission channel BCH of the base station or a safety message broadcast channel of the base station.

With reference to the fourth aspect or the first possible implementation manner of the fourth aspect, in a third possible implementation manner of the fourth aspect, if the transceiver module receives the safety message by using the cellular physical cellular PHY layer and the vehicle direct communication physical VDC PHY layer, the transceiver module is further configured to trigger the MAC layer to perform combination processing on the safety messages with a same sequence number that are received separately by using the Cellular PHY layer and the VDC PHY layer; and the transceiver module is further specifically configured to trigger the MAC layer to identify a safety message obtained after the combination processing and send the safety message obtained after the combination processing to the ITSP layer.

With reference to the fourth aspect, the first possible implementation manner of the fourth aspect, the second possible implementation manner of the fourth aspect, or the third possible implementation manner of the fourth aspect, in a fourth possible implementation manner of the fourth aspect, the transceiver module is specifically configured to: if the MAC layer identifies that the safety message is from the ITSP layer of the in-vehicle terminal, transparently send the safety message to the ITSP layer separately by using a Radio Link Control layer RLC layer and a Packet Data Convergence Protocol layer PDCP layer.

The present disclosure provides a message processing method, an in-vehicle terminal, and a base station. The method includes: first, generating, by a first in-vehicle terminal, a safety message; then, determining, by the first in-vehicle terminal according to message content and a message type, a priority value corresponding to the safety message; finally, sending, by the first in-vehicle terminal according to the priority value corresponding to the safety message, the safety message by using a vehicle direct communication physical VDC PHY layer or separately by using a cellular physical cellular PHY layer and a VDC PHY layer, so that a base station and/or a second in-vehicle terminal receive/receives the safety message, and the first in-vehicle terminal can send, under a preset delay requirement, the safety message to another in-vehicle terminal in a distance range that needs to be covered by the safety message.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present disclosure.

Figure 1:
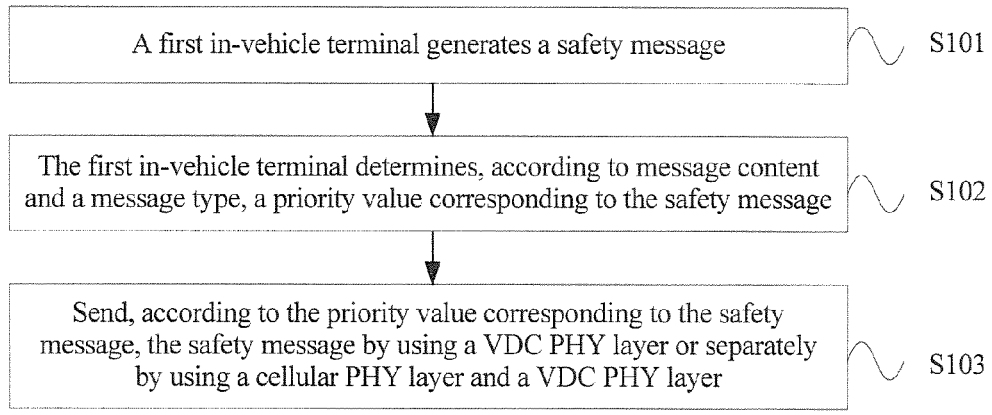
FIG. 1 is a flowchart of a message processing method according to an embodiment of the present invention.

FIG. 1 is a flowchart of a message processing method according to an embodiment of the present invention. The method may be applied to the field of Internet of Vehicles technologies and the method is performed by an in-vehicle terminal. The in-vehicle terminal has a vehicle direct communication (VDC) capability, and VDC is a vehicle direct communication technology designed based on a basic physical layer in Long Term Evolution (LTE). Steps included in the message processing method are specifically as follows:

S101: A first in-vehicle terminal generates a safety message.

Specifically, after the first in-vehicle terminal is powered on, the first in-vehicle terminal first searches for a cellular network, registers with the cellular network, and performs a safety authentication process. In the safety authentication process, the first in-vehicle terminal reports having a VDC capability. If the first in-vehicle terminal is an authorized subscriber, the network authorizes the first in-vehicle terminal to use the VDC capability. The first in-vehicle terminal generates the safety message, and the safety message includes message content and a message type. The message content refers to message content of traffic safety, for example, an emergency brake indication, a road maintenance indication, or a narrow road ahead indication. The message type refers to a type such as congestion, a road unsuitable for traffic, a brake failure, an icy road, or an accident.

S102: The first in-vehicle terminal determines, according to the message content and the message type, a priority value corresponding to the safety message.

Specifically, the content and the type of the safety message are related to a message delay, and the priority value of the message maybe determined according to the content and the type of the safety message.

S103: Send, according to the priority value corresponding to the safety message, the safety message by using a vehicle direct communication physical (VDC PHY) layer or separately by using a cellular physical (Cellular PHY) layer and a VDC PHY layer.

Figure 2:
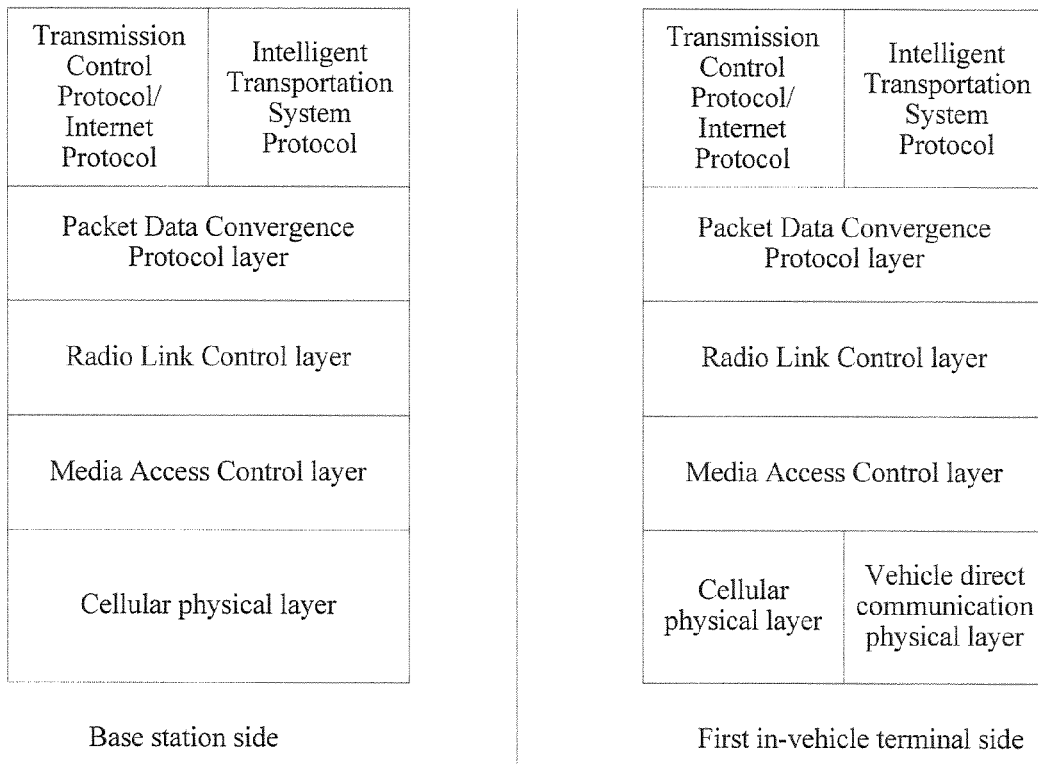
FIG. 2 is a schematic structural diagram of a VDC-RB according to an embodiment of the present invention.

Specifically, after the priority value corresponding to the safety message of the first in-vehicle terminal is determined, the safety message may be sent by using the vehicle direct communication physical VDC PHY layer, or the safety message may be sent by using both the cellular physical cellular PHY layer and the vehicle direct communication physical VDC PHY layer. Further, if the safety message of the first in-vehicle terminal needs to be transmitted in a wide range, that is, the message needs to be transmitted to a long distance, the safety message further needs to be sent by using the cellular PHY layer in addition to the vehicle direct communication physical VDC PHY layer, so that a base station and/or a second in-vehicle terminal receive/receives the safety message. The base station and the first in-vehicle terminal each pre-establish a vehicle direct communication-radio bearer (VDC-RB). FIG. 2 is a schematic structural diagram of a VDC-RB according to an embodiment of the present invention. As shown in FIG. 2, there are equivalent VDC-RBs on a base station side and on a first in-vehicle terminal side. The VDC-RB on the first in-vehicle terminal side includes a cellular PHY layer and a VDC PHY layer that parallelly form a layer. In addition, above the parallelly formed layer, there are successively a Media Access Control (MAC) layer, a Radio Link Control (RLC) layer, a Packet Data Convergence Protocol (PDCP) layer, an Intelligent Transportation System Protocol (ITSP) layer, and a Transmission Control Protocol/Internet Protocol (TCP/IP) layer. In addition, if a distance between the second in-vehicle terminal and the first in-vehicle terminal is less than or equal to a preset distance, the second in-vehicle terminal may directly receive the safety message sent by the first in-vehicle terminal.

This embodiment provides a message processing method, including: determining, by a first in-vehicle terminal according to message content and a message type, a priority value corresponding to a safety message; and sending, according to the priority value corresponding to the safety message, the safety message by using a VDC PHY layer or separately by using a cellular PHY layer and a VDC PHY layer. The priority value is determined according to the message content and the message type, and the message content and the message type are related to a delay and a distance that are of the message; therefore, a delay requirement and a distance requirement are considered when a PHY layer is determined according to a priority, so that the first in-vehicle terminal can send, under a preset delay requirement, the safety message to an in-vehicle terminal in a distance range that needs to be covered by the safety message.

Figure 3:
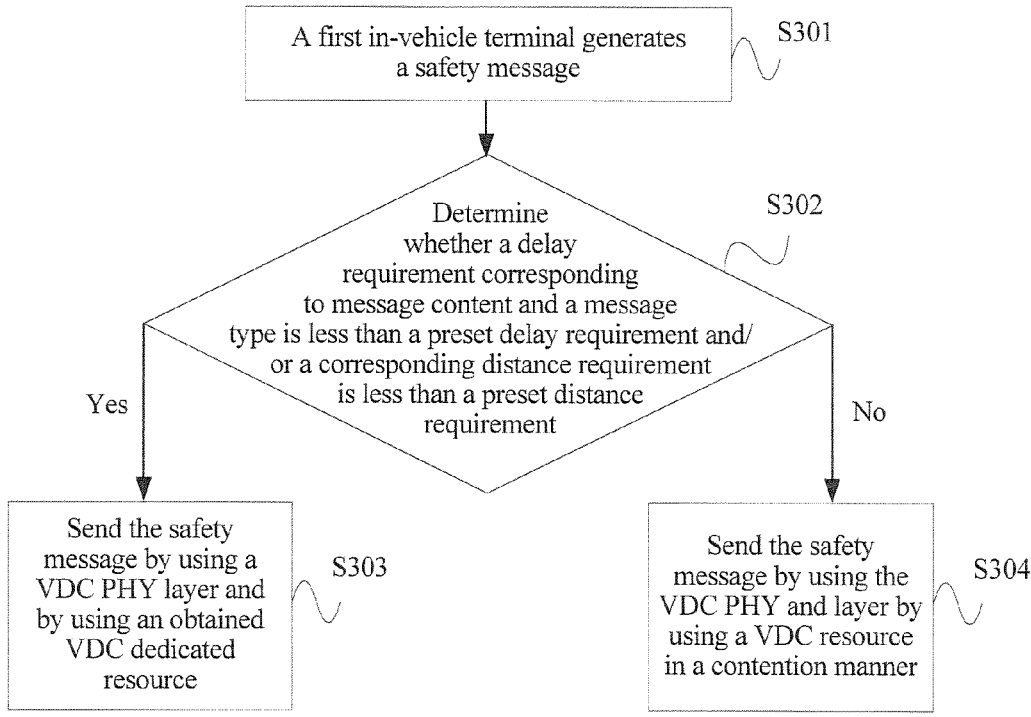
FIG. 3 is a flowchart of a message processing method according to another embodiment of the present invention.

FIG. 3 is a flowchart of a message processing method according to another embodiment of the present invention. The method may be applied to the field of Internet of Vehicles technologies and the method is performed by an in-vehicle terminal. The in-vehicle terminal has a VDC capability, and VDC is a vehicle direct communication technology designed based on a basic physical layer in LTE. In this message processing method, the foregoing steps are mainly further detailed based on the previous embodiment, and the following steps are specifically included:

S301: A first in-vehicle terminal generates a safety message.

Specifically, after the first in-vehicle terminal is powered on, the first in-vehicle terminal first searches for a cellular network, registers with the cellular network, and performs a safety authentication process. In the safety authentication process, the first in-vehicle terminal reports having a VDC capability. If the first in-vehicle terminal is an authorized subscriber, the network authorizes the first in-vehicle terminal to use the VDC capability. The first in-vehicle terminal generates the safety message, and the safety message includes message content and a message type. The message content refers to message content of traffic safety, for example, an emergency brake indication, a road maintenance indication, or a narrow road ahead indication. The message type refers to a type such as congestion, a road unsuitable for traffic, a brake failure, an icy road, or an accident.

S302: Determine whether a delay requirement corresponding to message content and a message type is less than a preset delay requirement and/or whether a corresponding distance requirement is less than a preset distance requirement, and if the delay requirement corresponding to the message content and the message type is less than the preset delay requirement and/or the corresponding distance requirement is less than the preset distance requirement, perform S303, or if the delay requirement corresponding to the message content and the message type is greater than or equal to the preset delay requirement and/or the corresponding distance requirement is greater than or equal to the preset distance requirement, perform S304.

Specifically, the delay requirement and the distance requirement of the safety message are determined according to the message content and the message type. The delay requirement of the safety message is compared with the preset delay requirement and the corresponding distance requirement is compared with the preset distance requirement, to determine whether the delay requirement corresponding to the message content and the message type is less than the preset delay requirement and/or whether the corresponding distance requirement is less than the preset distance requirement. Specifically, if it is determined that the delay requirement corresponding to the message content and the message type is less than the preset delay requirement and/or the corresponding distance requirement is less than the preset distance requirement, it is determined that a priority value corresponding to the safety message is less than a preset threshold. If it is determined that the delay requirement corresponding to the message content and the message type is greater than or equal to the preset delay requirement and/or the corresponding distance requirement is greater than or equal to the preset distance requirement, it is determined that a priority value corresponding to the safety message is greater than or equal to a preset threshold.

For example, if content of the safety message sent by the first in-vehicle terminal is an emergency brake indication message and a message type is a brake failure, it is determined according to the message content and the message type that the delay requirement of the safety message is 1 s. A preset delay requirement of a system is 2 s and a preset threshold is 2. Because the delay requirement of the safety message is less than the preset delay requirement, it is determined that the priority value corresponding to the safety message is less than the preset threshold, and it may be determined that the priority value of the safety message is 1. If content of the safety message sent by the first in-vehicle terminal is a road maintenance indication message and a message type is a road unsuitable for traffic, it is determined according to the message content and the message type that the delay requirement of the safety message is 30 s. A preset delay requirement of a system is 2 s and a preset threshold is 2. Because the delay requirement of the safety message is significantly greater than the preset delay requirement, it is determined that the priority value corresponding to the safety message is greater than the preset threshold, and it may be determined that the priority value of the safety message is 5.

S303: Send the safety message by using a VDC PHY layer and by using an obtained VDC dedicated resource. End.

In this embodiment, a smaller priority value of the safety message indicates a higher priority of the safety message. For example, in the foregoing example, a priority corresponding to the priority value 1 is higher than a priority corresponding to the priority value 5. In addition, the network may allocate the VDC dedicated resource to such a high-priority message in advance, and the VDC dedicated resource is used for sending the safety message.

Further, the method further includes: if the first in-vehicle terminal determines that the message content is message content transmitted in a wide range, further sending, by the first in-vehicle terminal, the safety message by using the cellular PHY layer. For example, if a collision accident happens, a vehicle within a range of 2 kilometers needs to be notified, and such a safety message also needs to be sent by using the VDC PHY layer. If the safety message is sent by using both the VDC PHY layer and the cellular PHY layer, a second in-vehicle terminal at a particular distance from the foregoing first in-vehicle terminal and a base station linked to the foregoing first in-vehicle terminal can receive the safety message.

S304: Send the safety message by using the VDC PHY layer and by using a VDC resource in a contention manner.

Specifically, if the priority value of the safety message is great, that is, the priority of the safety message is low, the VDC resource is used in the contention manner. When there are multiple safety messages at the MAC layer, a high-priority safety message is preferentially sent; when a channel can accommodate multiple safety messages, the messages are arranged in descending order of priorities. The first message sent by the MAC layer is a safety message with a highest priority. Such a safety message is sent only by using the VDC PHY layer, but not by using the cellular PHY layer. Therefore, the base station cannot receive this type of message. Only a vehicle around the transmitter can receive the information.

Optionally, after the in-vehicle terminal generates the safety message, and before the first in-vehicle terminal sends, according to the priority value corresponding to the safety message, the safety message by using the vehicle direct communication physical VDC PHY layer or by using the cellular physical cellular PHY layer and the VDC PHY layer, the method further includes: adding, by the first in-vehicle terminal, obtained location information and speed information to the safety message by using an Intelligent Transportation System Protocol ITSP layer; and transparently transmitting, by the first in-vehicle terminal, the safety message from the ITSP layer to the MAC layer by using a Packet Data Convergence Protocol layer PDCP layer and a Radio Link Control layer RLC layer. Therefore, that the first in-vehicle terminal sends, according to the priority value corresponding to the safety message, the safety message by using the vehicle direct communication physical VDC PHY layer or by using both the cellular physical cellular PHY layer and the VDC PHY layer includes: triggering, by the first in-vehicle terminal, the MAC layer to send, according to the priority value corresponding to the safety message, the safety message by using the vehicle direct communication physical VDC PHY layer or separately by using the cellular physical cellular PHY layer and the VDC PHY layer.

Specifically, after the first in-vehicle terminal generates the safety message, the safety message arrives at the ITSP layer; the ITSP layer obtains current location information and speed information from a positioning system such as a global positioning system (GPS), and adds the location information and the speed information to the safety message; the safety message transparently arrives at the MAC layer after passing through the PDCP layer and the RLC layer; then the MAC layer selects, according to a priority, a physical layer to send the safety message. In addition, the MAC layer may also integrate parameters such as the priority, and a broadcast mode and a transmit power value that are carried in a message primitive. Finally, the MAC layer determines, according to the parameters, a cellular PHY layer status, and a VDC PHY layer status, to send the safety message at two PHY layers or only at the VDC PHY layer. After the determining, a corresponding physical layer is scheduled for message coding and sending. A method for selecting a physical layer by the MAC layer is not limited thereto.

This embodiment provides a message processing method, including: determining a value relationship between a preset delay requirement and a delay requirement corresponding to message content and a message type and/or a value relationship between a corresponding distance requirement and a preset distance requirement; then determining a priority value corresponding to a safety message; finally sending, according to a result of the determining, the safety message by using a VDC PHY layer or by using a cellular PHY layer and a VDC PHY layer, so that a first in-vehicle terminal can send, under a preset delay requirement, the safety message to an in-vehicle terminal in a distance range that needs to be covered by the safety message.

Figure 4:
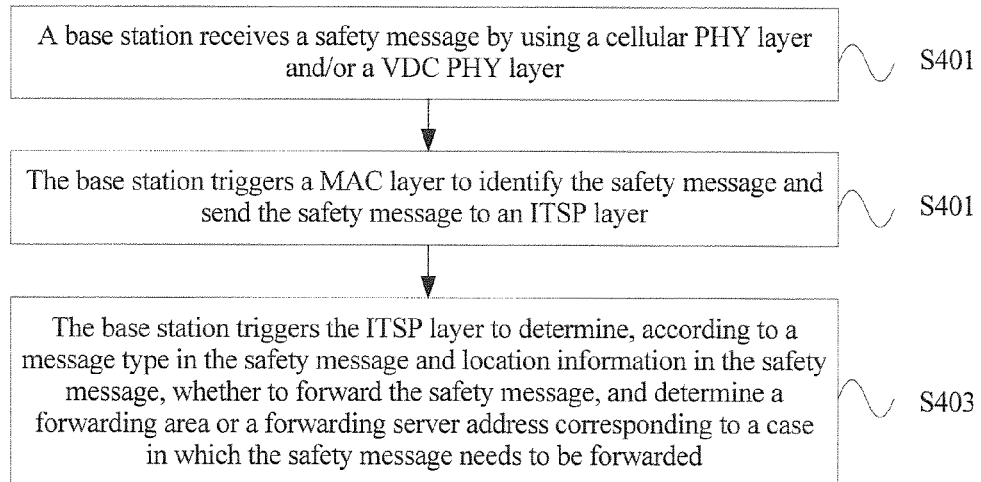
FIG. 4 is a flowchart of a message processing method according to still another embodiment of the present invention.

FIG. 4 is a flowchart of a message processing method according to still another embodiment of the present invention. The method may be applied to the field of Internet of Vehicles technologies and the method is performed by a base station. There may be two cases for the base station: with a VDC capability and without a VDC capability. Steps of the message processing method are specifically as follows:

S401: A base station receives a safety message by using a cellular PHY layer and/or a VDC PHY layer.

Specifically, if the base station has no VDC capability, the base station receives, by using the cellular PHY layer, only a safety message sent by a first in-vehicle terminal by using the cellular PHY layer; if the base station has a VDC capability, the cellular PHY layer and/or the VDC PHY layer of the base station receive/receives not only a safety message sent by the first in-vehicle terminal only by using the VDC PHY layer, but also a safety message sent by the first in-vehicle terminal by using the cellular PHY layer and the VDC PHY layer.

S402: The base station triggers a MAC layer to identify the safety message and send the safety message to an ITSP layer.

Specifically, the base station triggers the MAC layer to identify the safety message and determine whether the safety message is sent from the cellular PHY layer or from both the cellular PHY layer and the VDC PHY layer. If the safety message is a message sent by using the cellular PHY layer and the VDC PHY layer, the MAC layer combines messages sent by using the foregoing two layers, and sends a combined message to the ITSP layer.

S403: The base station triggers the ITSP layer to determine, according to a message type in the safety message and location information in the safety message, whether to forward the safety message, and determine a forwarding area or a forwarding server address corresponding to a case in which the safety message needs to be forwarded.

Specifically, the base station triggers the ITSP layer to determine, according to the message type in the safety message and the location information in the safety message, whether to forward the safety message. For example, if message content in the safety message is a narrow road ahead indication message and the message type is congestion, the base station triggers the ITSP layer to determine whether the message needs to be forwarded, determine the forwarding area according to the location information in the safety message, and determine whether the safety message needs to be forwarded to a server. It should be noted that, if the safety message has an extremely high delay requirement, a forwarding area does not need to be determined. For example, for some special geographic locations such as a mountain road corner, the base station needs to forward a low-priority message sent by an in-vehicle terminal near the corner by using VDC. In this case, the base station needs to forward all received safety messages, and generally does not perform complex forwarding area determining. During forwarding, the base station may broadcast the safety message by using a VDC frequency band. In this case, a physical device in the VDC frequency band of the base station independently uses a special VDC path. The base station or a base station on a core network side allocates a special identifier to the base station, and adds the identifier into a database. After receiving the safety message, the in-vehicle terminal may determine that the safety message is a safety message forwarded by the foregoing base station.

This embodiment of the present invention provides a message processing method. The method includes: first, receiving, by a base station, a safety message by using a cellular PHY layer and/or a VDC PHY layer; then, triggering, by the base station, a Media Access Control MAC layer to identify the safety message and send the safety message to an ITSP layer; and finally, triggering, by the base station, the ITSP layer to determine, according to a message type in the safety message and location information in the safety message, whether to forward the safety message, and determine a forwarding area or a forwarding server address corresponding to a case in which the safety message needs to be forwarded, so that the base station intelligently determines the forwarding area of the message according to the message type and the location information that are in the safety message.

Figure 5:
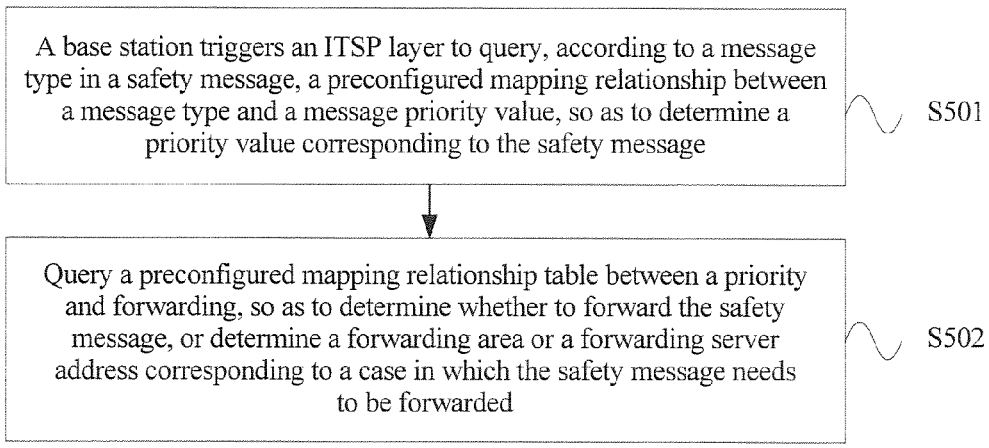
FIG. 5 is a flowchart of a message processing method according to yet another embodiment of the present invention.

FIG. 5 is a flowchart of a message processing method according to yet another embodiment of the present invention. The method is performed by a base station. In this method, step S403 in the foregoing embodiment is mainly further detailed based on the previous embodiment. Specific steps of this method are as follows:

S501: A base station triggers an ITSP layer to query, according to a message type in a safety message, a preconfigured mapping relationship between a message type and a message priority value, so as to determine a priority value corresponding to the safety message.

Optionally, before that a base station triggers an ITSP layer to query, according to a message type in a safety message, a preconfigured mapping relationship between a message type and a message priority value, so as to determine a priority value corresponding to the safety message, if the base station receives the safety message by using a cellular physical cellular PHY layer and/or a vehicle direct communication physical VDC PHY layer, the method further includes : triggering, by the base station, a MAC layer to perform combination processing on the safety message received by using the Cellular PHY layer and the safety message received by using the VDC PHY layer. A specific combination manner is that the base station triggers the MAC layer to perform combination processing on safety messages with a same sequence number that are received separately by using the Cellular PHY layer and the VDC PHY layer.

Further, if the MAC layer identifies that the safety message is from the ITSP layer of the in-vehicle terminal, the base station transparently sends the safety message to the ITSP layer separately by using a Radio Link Control layer RLC layer and a Packet Data Convergence Protocol layer PDCP layer.

S502: Query a preconfigured mapping relationship table between a priority and forwarding, so as to determine whether to forward the safety message, or determine a forwarding area or a forwarding server address corresponding to a case in which the safety message needs to be forwarded.

Optionally, the forwarding area corresponding to the case in which the safety message needs to be forwarded includes a coverage area of the base station or further includes a coverage area of another base station adjacent to the base station. Further, if the forwarding area is the coverage area of the base station, the base station forwards the safety message in a broadcast manner. The foregoing broadcast manner includes performing broadcast by using a broadcast transmission channel (BCH) of the base station or a safety message broadcast channel of the base station. Specifically, when performing broadcast by using the BCH, the base station may add a new system information block (SIB) such as a SIB 25, to dedicatedly place the safety message. Duration is set according to a safety message type requirement. Alternatively, the base station adds a safety message broadcast channel such as a physical downlink safety message channel (PDSMCH), and a configuration parameter of the channel appears on a physical downlink control channel (PDCCH) or in a Paging 2 message. When the configuration parameter appears in the PDCCH, a scrambled radio network temporary identifier (RNTI) is a common RNTI and is referred to as an SM-RNTI in this application. When obtaining, by means of decoding, scheduling information of the PDCCH scrambled by using the SM-RNTI, the in-vehicle terminal may determine scheduling information of a resource occupied by the safety message in this case, and then the in-vehicle terminal receives and decodes a physical signal of a physical layer resource indicated by the foregoing scheduling information, so as to obtain a real safety message. The Paging 2 message carries the SM-RNTI and the scheduling information of the resource. Therefore, a terminal receives the physical signal of the physical layer resource indicated by the foregoing scheduling information, so as to obtain the real safety message. In the foregoing two methods, the PDCCH requires the terminal to keep parsing the PDCCH to learn whether the PDSMCH appears. The terminal performs frequent processing and has a high requirement for a processing capability. The Paging 2 message saves the processing capability, but the Paging 2 message appears periodically, and sometimes a delay of the safety message cannot be met. To save the processing capability of the in-vehicle terminal and meet the delay, the base station may combine the two methods, where the paging 2 message is used when the safety message is received for the first time, and then PDCCH information is used for scheduling the PDSMCH within a subsequent period of time. If no safety message appears for a long time, the in-vehicle terminal may no longer receive the PDCCH information. That is, the terminal first periodically receive the paging 2 message and starts to receive the PDCCH information after the SM-RNTI is found. If no scheduling information scrambled by using the SM-RNTI is found within a period of time by decoding the PDCCH, the terminal returns to a state in which only the paging 2 message is received.

This embodiment provides a message processing method, including: first, receiving, by a base station, a safety message by using a cellular PHY layer and/or a VDC PHY layer; then triggering a MAC layer to identify the safety message and transparently send the safety message to an ITSP layer at an RLC layer and a PDCP layer; and finally triggering, by the base station, the ITSP layer to determine, according to message content and a message type in the safety message and location information in the safety message, whether to forward the safety message, and determine a forwarding area or a forwarding server corresponding to a case in which the safety message needs to be forwarded. Because the safety message is transmitted in the transparent mode at the RLC layer and the PDCP layer, a delay is reduced, so that the base station receives the safety message under a preset delay requirement and forwards, in a timely manner, the received safety message to another in-vehicle terminal within a distance range that can be covered, another base station, or another server station.

Figure 6:
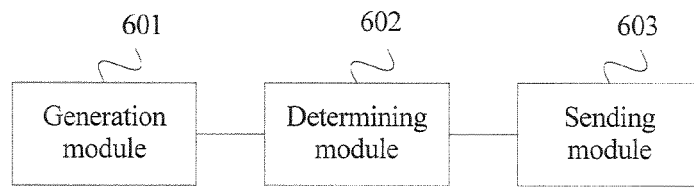
FIG. 6 is a schematic structural diagram of an in-vehicle terminal according to an embodiment of the present invention.

FIG. 6 is a schematic structural diagram of an in-vehicle terminal according to an embodiment of the present invention. The in-vehicle terminal is used to perform the message processing method in the embodiment corresponding to FIG. 1. Specifically, the in-vehicle terminal includes: a generation module 601, a determining module 602, and a sending module 603. The generation module 601 is configured to generate a safety message, where the safety message includes message content and a message type. The determining module 602 is configured to determine, according to the message content and the message type, a priority value corresponding to the safety message. The sending module 603 is configured to send, according to the priority value corresponding to the safety message, the safety message by using a vehicle direct communication physical VDC PHY layer or separately by using a cellular physical cellular PHY layer and a VDC PHY layer, so that a base station and/or a second in-vehicle terminal receive/receives the safety message, where the base station and the in-vehicle terminal each establish a vehicle direct communication-radio bearer VDC-RB.

The in-vehicle terminal in this embodiment may be used to implement the technical solution in the method embodiment shown in FIG. 1, and implementation principles and technical effects thereof are similar and are not described herein again.

Figure 7:
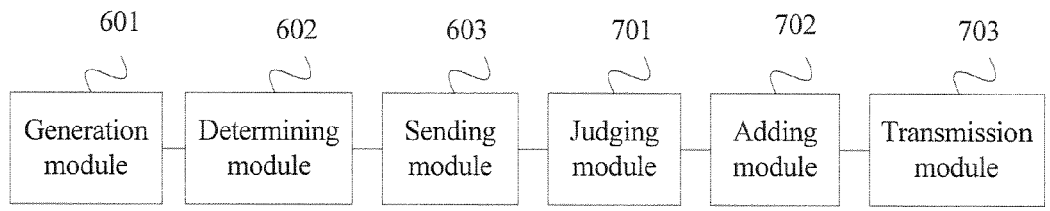
FIG. 7 is a schematic structural diagram of an in-vehicle terminal according to another embodiment of the present invention.

FIG. 7 is a schematic structural diagram of an in-vehicle terminal according to another embodiment of the present invention. Based on the previous embodiment, the in-vehicle terminal in this embodiment further includes a judging module 701. The judging module 701 is configured to determine whether the priority value corresponding to the safety message is less than a preset threshold. The sending module 603 is specifically configured to: if the judging module 701 determines that the priority value corresponding to the safety message is less than the preset threshold, apply to the base station for a vehicle direct communication VDC dedicated resource, and send the safety message by using the DVC PHY layer and by using the obtained vehicle direct communication VDC dedicated resource; or if the judging module 701 determines that the priority value corresponding to the safety message is greater than or equal to the preset threshold, the sending module 603 sends the safety message by using the VDC PHY layer and by using a VDC resource in a contention manner. Further, the sending module 603 is further configured to: if the judging module determines that the message content is message content transmitted in a wide range, send the safety message by using the cellular PHY layer. In addition, the determining module 602 is specifically configured to: if a delay requirement corresponding to the message content and the message type is less than a preset delay requirement and/or a corresponding distance requirement is less than a preset distance requirement, determine that the priority value corresponding to the safety message is less than the preset threshold; or if the delay requirement corresponding to the message content and the message type is greater than or equal to the preset delay requirement and/or the corresponding distance requirement is greater than or equal to the preset distance requirement, determine that the priority value corresponding to the safety message is greater than or equal to the preset threshold. Still further, an adding module 702 is configured to add obtained location information and speed information to the safety message by using an Intelligent Transportation System. Protocol ITSP layer; a transmission module 703 is configured to transparently transmit the safety message from the ITSP layer to a MAC layer by using a Packet Data Convergence Protocol layer PDCP layer and a Radio Link Control layer RLC layer; and the sending module 603 is specifically configured to trigger the MAC layer to send, according to the location information, the speed information, and the priority value corresponding to the security message, the safety message by using the VDC PHY layer or by using the cellular PHY layer and the VDC PHY layer.

The in-vehicle terminal in this embodiment may be used to implement the technical solution in the method embodiment shown in FIG. 3, and implementation principles and technical effects thereof are similar and are not described herein again.

Figure 8:
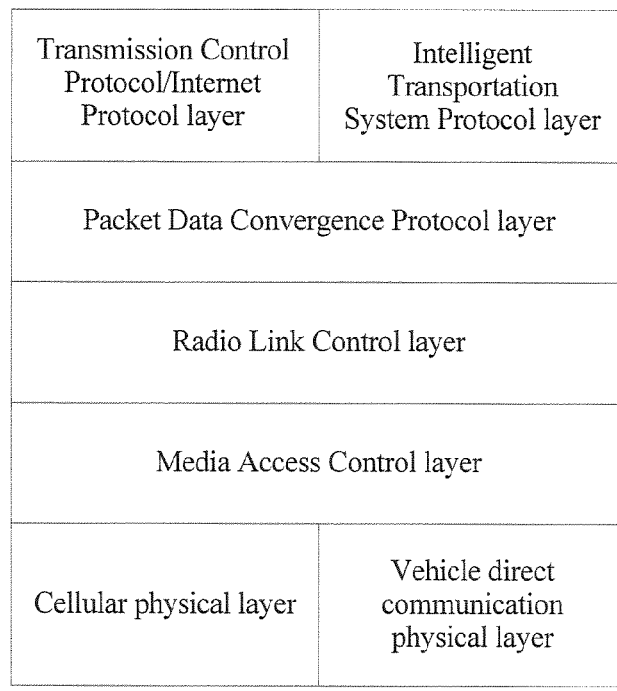
FIG. 8 is a schematic structural diagram of a vehicle direct communication-radio bearer VDC-RB according to still another embodiment of the present invention.

FIG. 8 is a schematic structural diagram of a vehicle direct communication-radio bearer VDC-RB according to still another embodiment of the present invention. The VDC-RB includes: a Transmission Control Protocol TCP/Internet Protocol IP layer 801, used to run the Transmission Control Protocol TCP/Internet Protocol IP and used to transmit entertainment information that is not emergent; and an Intelligent Transportation System Protocol ITSP layer 802, used to run the Intelligent Transportation System Protocol ITSP. Specifically, the ITSP layer 802 is used to receive a safety message from a bottom layer, that is, a safety message sent by a Packet Data Convergence Protocol PDCP layer 804, where the safety message is in a form of a data packet; the ITSP layer 802 is further used to remove a packet head and send content of the safety message to a safety message processing module. The ITSP layer 802 is further used to receive a message of the safety message processing module and add a packet head. A safety message sent by the ITSP layer 802 is transparently sent to the PDCP layer 804 and an RLC layer 803 successively. Then the RLC layer 803 sends the foregoing safety message whose packet head is removed to a Media Access Control MAC layer 805. The MAC layer 805 is used to configure an Intelligent Transport System Protocol-common transport channel ITS-CCH. The ITS-CCH is used to: receive safety messages sent by a cellular PHY layer and a VDC PHY layer, perform selective combination, delete a transmitter identifier of the safety message, and send the safety message to the Radio Link Control RLC layer 803. The ITS-CCH is further used to: receive a safety message transmitted by the RLC layer 803, select, according to location information, speed information, and a priority value corresponding to the safety message, a VDC PHY layer 807 to send the safety message, or the cellular PHY layer 806 and the VDC PHY layer 807 to send the safety message. The MAC layer 805 is further used to receive the safety message sent by the RLC layer 803 in the transparent mode and determine to deliver the safety message to the cellular PHY layer 806 and/or the VDC PHY layer 807 according to a message priority, location information, and speed information. The RLC layer 803 sends the safety message to the Packet Data Convergence Protocol PDCP layer 804 in the transparent mode. The PDCP layer 804 sends the safety message to the Intelligent Transportation System Protocol ITSP layer 802 in the transparent mode. The cellular physical cellular PHY layer 806 is used to perform cellular communication with the base station. The vehicle direct communication physical VDC PHY layer 807 is used to perform direct communication with the base station and/or another in-vehicle terminal. If the cellular PHY layer 806 and/or the VDC PHY layer 807 have/has obtained an allocated resource, the cellular PHY layer 806 and/or the VDC PHY layer 807 directly perform/performs sending by using the resource; if the cellular PHY layer 806 and/or the VDC PHY layer 807 have/has not obtained an allocated resource, a process of applying for the resource is triggered. In processes of applying for a cellular resource and a VDC resource, a process of applying for a resource by a linked-state in-vehicle terminal in a current LTE system may be used.

Figure 9:
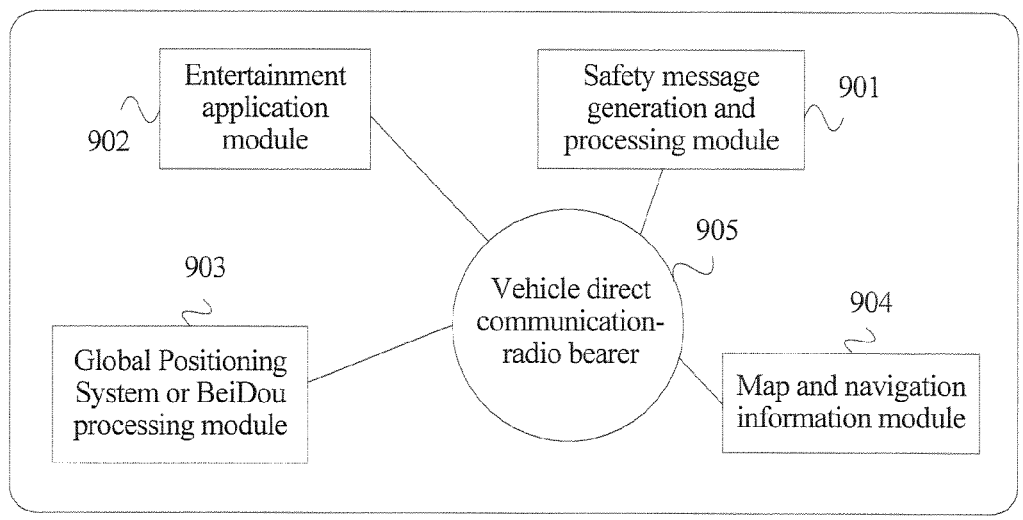
FIG. 9 is a schematic structural diagram of an in-vehicle terminal according to still another embodiment of the present invention.

In addition, FIG. 9 is a schematic structural diagram of an in-vehicle terminal according to still another embodiment of the present invention. As shown in FIG. 9, the in-vehicle terminal includes: a safety message generation and processing module 901, an entertainment application module 902, a Global Positioning System (Global Positioning System, GPS) or BeiDou processing module 903, a map and navigation information module 904, and a VDC-RB 905. The VDC-RB 905 has communication connections to all other modules. The safety message generation and processing module 901 herein is equivalent to the generation module 601 in the embodiment corresponding to FIG. 6; the VDC-RB 905 is the VDC-RB provided in the previous embodiment, and units included in the VDC-RB and functions of all the units are the same as those in the previous embodiment and are not described herein again.

Figure 10:
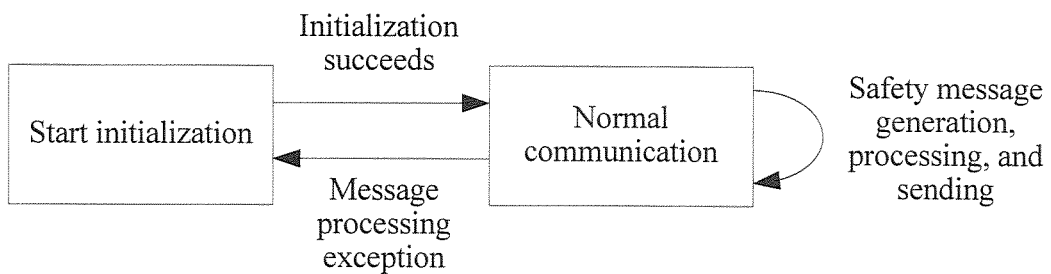
FIG. 10 is a schematic structural diagram of a state machine of an in-vehicle terminal according to yet another embodiment of the present invention.

Further, VDC resources received by the in-vehicle terminal are all VDC resources configured in a cell to which the in-vehicle terminal belongs, that is, if the VDC resource configured in the cell is a bandwidth of 5 M, the in-vehicle terminal needs to receive all of the bandwidth of 5 M. A VDC transmission resource is one of the VDC resources configured in the cell and may be configured to the in-vehicle terminal with network authorization. FIG. 10 is a schematic structural diagram of a state machine of an in-vehicle terminal according to yet another embodiment of the present invention. As shown in FIG. 10, a communications state machine of the vehicle terminal has two communication states: an initialization state and a normal communication state. An action in the initialization state is an action for establishing the VDC-RB; actions in the normal communication state are receiving and transmitting a VDC signal and receiving and transmitting a cellular signal. After initialization, the in-vehicle terminal jumps to the normal communication state; if in the normal communication state, a message receiving exception appears or a pilot signal of a cellular cell is lost, the in-vehicle terminal jumps to the initialization state.

Figure 11:
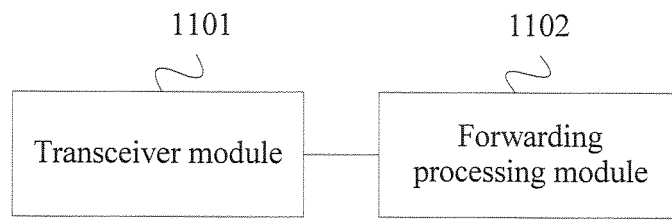
FIG. 11 is a schematic structural diagram of a base station according to an embodiment of the present invention.

FIG. 11 is a schematic structural diagram of a base station according to an embodiment of the present invention. The in-vehicle terminal is used to perform the message processing method in the embodiment corresponding to FIG. 4. Specifically, the base station includes: a transceiver module 1101, configured to receive a safety message by using a cellular physical cellular PHY layer and/or a vehicle direct communication physical VDC PHY layer, where the transceiver module 1101 is further configured to trigger a Media Access Control MAC layer to identify the safety message and send the safety message to an Intelligent Transportation System Protocol ITSP layer; and a forwarding processing module 1102, configured to trigger the ITSP layer to determine, according to a message type in the safety message and location information in the safety message, whether to forward the safety message, and determine a forwarding area or a forwarding server address corresponding to a case in which the safety message needs to be forwarded.

The base station in this embodiment may be used to implement the technical solution in the method embodiment shown in FIG. 4, and implementation principles and technical effects thereof are similar and are not described herein again.

Figure 12:
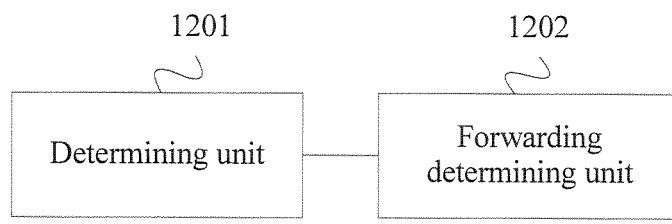
FIG. 12 is a schematic structural diagram of a base station according to another embodiment of the present invention.

FIG. 12 is a schematic structural diagram of a base station according to another embodiment of the present invention. Based on the previous embodiment, the forwarding processing module 1102 further includes a determining unit 1201 and a forwarding determining unit 1202. The determining unit 1201 is specifically configured to trigger the ITSP layer to query, according to the message type in the safety message, a preconfigured mapping relationship between a message type and a message priority, so as to determine a priority value corresponding to the safety message. The forwarding determining unit 1202 is specifically configured to: query a preconfigured mapping relationship table between a priority and forwarding, so as to determine whether to forward the safety message; and determine the corresponding forwarding area or the corresponding forwarding server address when the safety message needs to be forwarded. The forwarding area corresponding to the case in which the safety message needs to be forwarded includes a coverage area of the base station or further includes a coverage area of another base station adjacent to the base station. When the forwarding area is a coverage area of the base station, the forwarding determining unit 1202 is specifically configured to forward the safety message by using a broadcast transmission channel BCH of the base station or a safety message broadcast channel of the base station. If the transceiver module 1101 receives the safety message by using the cellular physical cellular PHY layer and the vehicle direct communication physical VDC PHY layer, the transceiver module 1101 is further configured to trigger the MAC layer to perform combination processing on a safety message received by using the Cellular PHY layer and a safety message received by using the VDC PHY layer. The sending module 1102 is further configured to trigger the MAC layer to identify a safety message obtained after the combination processing and send the safety message obtained after the combination processing to the ITSP layer. The safety message obtained after the combination processing is a message obtained after the combination processing is performed on safety messages with a same serial number that are received by using the cellular PHY layer and the VDC PHY layer. Optionally, the transceiver module 1101 is further configured to: if the MAC layer identifies that the safety message is from the ITSP layer of the in-vehicle terminal, transparently send the safety message to the ITSP layer by using a Radio Link Control layer RLC layer and a Packet Data Convergence Protocol layer PDCP layer.

The base station in this embodiment may be used to implement the technical solution in the method embodiment shown in FIG. 5, and implementation principles and technical effects thereof are similar and are not described herein again.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A message processing method, the method comprising:
generating, by a first in-vehicle terminal, a safety message, wherein the safety message comprises message content and a message type;
determining, by the first in-vehicle terminal according to the message content and the message type, a priority value corresponding to the safety message;
sending, by the first in-vehicle terminal according to the priority value corresponding to the safety message, the safety message by using a vehicle direct communication physical (VDC PHY) layer or separately by using a cellular physical (cellular PHY) layer and the VDC PHY layer, so that a base station and/or a second in-vehicle terminal receive/receives the safety message;

wherein the base station and the first in-vehicle terminal each pre-establish a vehicle direct communication-radio bearer (VDC-RB);

wherein after generating, by the first in-vehicle terminal, the safety message, and before sending, by the first in-vehicle terminal according to the priority value corresponding to the safety message, the safety message by using the VDC PHY layer or separately by using the cellular PHY layer and the VDC PHY layer, the method further comprises:

adding, by the first in-vehicle terminal, obtained location information and speed information to the safety message by using an Intelligent Transportation System Protocol (ITSP) layer; and transparently transmitting, by the first in-vehicle terminal, the safety message from the ITSP layer to a Media Access Control (MAC) layer by using a Packet Data Convergence Protocol layer (PDCP) layer and a Radio Link Control layer (RLC) layer; and sending, by the first in-vehicle terminal according to the priority value corresponding to the safety message, the safety message by using a vehicle direct communication physical VDC PHY layer or separately by using a cellular physical cellular PHY layer and the VDC PHY layer comprises:

triggering, by the first in-vehicle terminal, the MAC layer to send, according to the location information, the speed information, and the priority value corresponding to the safety message, the safety message by using the VDC PHY layer or separately by using the cellular PHY layer and the VDC PHY layer.

2. The method according to claim 1, wherein sending, by the first in-vehicle terminal according to the priority value corresponding to the safety message, the safety message by using the VDC PHY layer or separately by using the cellular PHY layer and the VDC PHY layer comprises:

if the first in-vehicle terminal determines that the priority value corresponding to the safety message is less than a preset threshold, applying, by the first in-vehicle terminal, to the base station for a vehicle direct communication (VDC) dedicated resource, and sending the safety message by using the VDC PHY layer and by using the obtained vehicle direct communication VDC dedicated resource; or if the first in-vehicle terminal determines that the priority value corresponding to the safety message is greater than or equal to the preset threshold, sending, by the first in-vehicle terminal, the safety message by using the VDC PHY layer and by using a VDC resource in a contention manner.

3. The method according to claim 2, further comprising: when the first in-vehicle terminal determines that the message content is message content transmitted in a wide range, further sending, by the first in-vehicle terminal, the safety message by using the cellular PHY layer.

4. The method according to claim 2, wherein determining, by the first in-vehicle terminal according to the message content and the message type, the priority value corresponding to the safety message comprises:

if a delay requirement corresponding to the message content and the message type is less than a preset delay requirement and/or a corresponding distance requirement is less than a preset distance requirement, determining, by the first in-vehicle terminal, that the priority value corresponding to the safety message is less than the preset threshold; or if the delay requirement corresponding to the message content and the message type is greater than or equal to the preset delay requirement and/or the corresponding distance requirement is greater than or equal to the preset distance requirement, determining, by the first in-vehicle terminal, that the priority value corresponding to the safety message is greater than or equal to the preset threshold.

5. A message processing method, the method comprising:
receiving, by a base station, a safety message by using a cellular physical (cellular PHY) layer and/or a vehicle direct communication physical (VDC PHY) layer;

triggering, by the base station, a Media Access Control (MAC) layer to identify the safety message and send the safety message to an Intelligent Transportation System Protocol (ITSP) layer;

triggering, by the base station, the ITSP layer to determine, according to a message type in the safety message and location information in the safety message, whether to forward the safety message, and determine a forwarding area or a forwarding server address corresponding to a case in which the safety message needs to be forwarded;

wherein when the base station receives the safety message by using the cellular PHY layer and the VDC PHY layer, the method further comprises:

triggering, by the base station, the MAC layer to perform combination processing on the safety messages with a same sequence number that are separately received by using the cellular PHY layer and the VDC PHY layer; and triggering, by the base station, the MAC layer to identify the safety message and send the safety message to an ITSP layer comprises:

triggering, by the base station, the MAC layer to identify a safety message obtained after the combination processing and sending the safety message obtained after the combination processing to the ITSP layer.

6. The method according to claim 5, wherein triggering, by the base station, the ITSP layer to determine, according to the message type in the safety message and location information in the safety message, whether to forward the safety message, and determine the forwarding area or the forwarding server address corresponding to the case in which the safety message needs to be forwarded comprises:

triggering, by the base station, the ITSP layer to query, according to the message type in the safety message, a preconfigured mapping relationship between a message type and a message priority, so as to determine a priority value corresponding to the safety message; and querying a preconfigured mapping relationship table between a priority value and forwarding, so as to determine whether to forward the safety message, and determining the corresponding forwarding area or the corresponding forwarding server address when the safety message needs to be forwarded.

7. The method according to claim 5, wherein the forwarding area corresponding to the case in which the safety message needs to be forwarded comprises a coverage area of the base station or further comprises a coverage area of another base station adjacent to the base station.

8. The method according to claim 7, wherein when the forwarding area is the coverage area of the base station, the base station forwards the safety message by using a broadcast transmission channel (BCH) of the base station or a safety message broadcast channel of the base station.

9. The method according to claim 5, wherein triggering, by the base station, the MAC layer to identify the safety message and send the safety message to the ITSP layer comprises:
when the base station identifies, by using the MAC layer, that the safety message is from the ITSP layer of the in-vehicle terminal, transparently sending, by the base station, the safety message to the ITSP layer separately by using a Radio Link Control layer (RLC) layer and a Packet Data Convergence Protocol layer (PDCP) layer.

10. An in-vehicle terminal, comprising:
a memory storing a program; and
a processor, configured to execute the program, the program comprising instructions that, when executed by the processor, cause the in-vehicle terminal to:
generate a safety message, wherein the safety message comprises message content and a message type;
determine, according to the message content and the message type, a priority value corresponding to the safety message; and
send, according to the priority value corresponding to the safety message, the safety message by using a vehicle direct communication physical (VDC PHY) layer or separately by using a cellular physical (cellular PHY) layer and the VDC PHY layer, so that a base station and/or a second in-vehicle terminal receive/receives the safety message;
wherein the base station and the in-vehicle terminal each pre-establish a vehicle direct communication-radio bearer (VDC-RB), wherein the VDC-RB comprises:
a Transmission Control Protocol (TCP)/Internet Protocol (IP) layer, used to run the TCP/IP,
an Intelligent Transportation System Protocol (ITSP) layer, used to run the Intelligent Transportation System Protocol (ITSP),
a Media Access Control (MAC) layer, used to configure an Intelligent Transportation System Protocol-common transport channel (ITS-CCH), wherein the ITS-CCH is used to:
receive the safety message sent by the VDC PHY layer of the in-vehicle terminal,
delete a transmitter identifier of the safety message, and send the safety message to the Radio Link Control layer (RLC) layer, and
receive the safety message transmitted by the RLC layer and select, according to the location information, the speed information, and the priority value corresponding to the safety message, the VDC PHY layer to send the safety message, or the cellular PHY layer and the VDC PHY layer to send the safety message;
the RLC layer, used to send the safety message to a Packet Data Convergence Protocol (PDCP) layer in a transparent transmission mode,
the PDCP layer, used to send the safety message to the ITSP layer in the transparent transmission mode,
the cellular PHY layer, used to perform cellular communication with the base station, and
the VDC PHY layer, used to perform direct communication with the base station or another in-vehicle terminal.

11. The in-vehicle terminal according to claim 10, wherein the program further comprises instructions that, when executed by the processor, cause the in-vehicle terminal to:
determine whether the priority value corresponding to the safety message is less than a preset threshold; and
if it is determined that the priority value corresponding to the safety message is less than the preset threshold, apply to the base station for a vehicle direct communication VDC dedicated resource, and send the safety message by using the DVC PHY layer and by using the obtained vehicle direct communication VDC dedicated resource; or
if it is determined that the priority value corresponding to the safety message is greater than or equal to the preset threshold, send the safety message by using the VDC PHY layer and by using a VDC resource in a contention manner.

12. The in-vehicle terminal according to claim 11, wherein the program further comprises instructions that, when executed by the processor, cause the in-vehicle terminal to:
when it is determined that the message content is message content transmitted in a wide range, send the safety message by using the cellular PHY layer.

13. The in-vehicle terminal according to claim 11, wherein when the instructions executed by the processor cause the in-vehicle terminal to determine the priority value corresponding to the safety message, the instructions executed by the processor further cause the in-vehicle terminal to:
if a delay requirement corresponding to the message content and the message type is less than a preset delay requirement and/or a corresponding distance requirement is less than a preset distance requirement, determine that the priority value corresponding to the safety message is less than the preset threshold; or
if the delay requirement corresponding to the message content and the message type is greater than or equal to the preset delay requirement and/or the corresponding distance requirement is greater than or equal to the preset distance requirement, determine that the priority value corresponding to the safety message is greater than or equal to the preset threshold.

14. The in-vehicle terminal according to claim 10, the program further comprising instructions that, when executed by the processor, cause the in-vehicle terminal to:
add obtained location information and speed information to the safety message by using an Intelligent Transportation System Protocol ITSP layer; and
transparently transmit the safety message from the ITSP layer to a Media Access Control (MAC) layer by using a Packet Data Convergence Protocol (PDCP) layer and a Radio Link Control layer (RLC) layer; and
trigger the MAC layer to send, according to the location information, the speed information, and the priority value corresponding to the safety message, the safety message by using the VDC PHY layer or separately by using the cellular PHY layer and the VDC PHY layer.

* * * * *